(12) United States Patent
Hansen

(10) Patent No.: US 7,509,796 B2
(45) Date of Patent: Mar. 31, 2009

(54) PINTLE-CONTROLLED PROPULSION SYSTEM WITH EXTERNAL DYNAMIC SEAL

(75) Inventor: William E. Hansen, Sacramento, CA (US)

(73) Assignee: Aerojet-General Corporation, Sacramento, CA (US)

( * ) Notice: Subject to any disclaimer, the term of this patent is extended or adjusted under 35 U.S.C. 154(b) by 0 days.

(21) Appl. No.: 11/531,655

(22) Filed: Sep. 13, 2006

(65) Prior Publication Data

US 2009/0007540 A1    Jan. 8, 2009

(51) Int. Cl.
*F02K 1/08* (2006.01)

(52) U.S. Cl. ............ 60/225; 60/771; 239/265.19; 251/250

(58) Field of Classification Search ............ 60/235, 60/242, 771, 224, 225; 239/265.19; 251/122, 251/250
See application file for complete search history.

(56) References Cited

U.S. PATENT DOCUMENTS

| | | | | |
|---|---|---|---|---|
| 2,814,929 | A | * | 12/1957 | Morley et al. ............ 60/242 |
| 3,059,425 | A | * | 10/1962 | McSherry et al. ............ 60/242 |
| 3,073,112 | A | * | 1/1963 | Bleikamp ............ 60/242 |
| 3,848,806 | A | * | 11/1974 | Samuelsen et al. ............ 60/242 |
| 3,943,708 | A | | 3/1976 | Panella |
| 4,777,795 | A | | 10/1988 | Le Corre et al. |
| 5,394,690 | A | | 3/1995 | Arszman et al. |
| 5,435,128 | A | | 7/1995 | Miskelly, Jr. et al. |
| 5,456,425 | A | | 10/1995 | Morris et al. |
| 6,170,257 | B1 | * | 1/2001 | Harada et al. ............ 60/242 |
| 6,591,603 | B2 | | 7/2003 | Dressler et al. |
| 6,651,438 | B2 | | 11/2003 | McGrath et al. |
| 6,845,607 | B2 | | 1/2005 | Lair |

OTHER PUBLICATIONS

Burrows, S.; "Status of Army Pintle Technology for Controllable Thrust Propulsion"; 2001, *37th AIAA/ASME/SAE/ASEE Joint Propulsion Conference and Exhibit*, AIAA 2001-3598, 9 pages.
Peck, Michael; "Adjustable Rocket Motor Makes Tactical Missiles More Flexible"; 2004, *National Defense Magazine*, 2 pages.
"Advanced Propulsion for Tactical Missiles"; 2001, *NDIA Conference on Armaments for the Army Transformation*, 28 pages.
"Solid Rocket Motor Nozzles"; 1975, *National Aeronautics and Space Administration*, NASA Space Vehicle Design Criteria (Chemical Propulsion) NASA SP-8115, 132 pages.

* cited by examiner

*Primary Examiner*—Louis J Casaregola
(74) *Attorney, Agent, or Firm*—Townsend and Townsend and Crew LLP.; M. Henry Heines

(57) ABSTRACT

A propulsion system with a pintle for variable thrust is constructed such that the pintle contains a shaft at its fore end which passes through an opening in the thrust chamber wall and extends into a boss on the outside surface of the thrust chamber. A dynamic seal that maintains the pressurization of the thrust chamber while allowing movement of the pintle is positioned inside the boss, between the pintle shaft and the boss, and actuation of the pintle is achieved by a rack affixed to the fore end of the pintle and a gear that engages the rack. The dynamic seal, rack and gear are thus external to the thrust chamber, providing the thrust chamber with a compact external envelope, a greater thermal standoff, or both.

7 Claims, 4 Drawing Sheets

PINTLE-CONTROLLED PROPULSION SYSTEM WITH EXTERNAL DYNAMIC SEAL

BACKGROUND OF THE INVENTION

1. Field of the Invention

This invention resides in the field of propulsion systems with variable thrust, and in particular to nozzles that utilize pintles to vary the nozzle throat area.

2. Description of the Prior Art

Mechanisms for thrust variation have long been used to provide rocket motors with a relatively high thrust at the boost stage and a low thrust during the sustain phase. Early efforts to achieve this type of boost-sustain transition focused on the configuration of the solid propellant grain to provide a high burning surface area in the early stages of burning while the shape of the propellant grain by itself caused a reduction in the burning surface area as burning progressed. The variability produced by such a design was limited however and not controllable during flight, and the shape of the propellant grain was often optimal for only one of the phases, usually the boost phase. Subsequent efforts focused on the throat of the motor nozzle by introducing various for changing the effective throat area. A decrease in the effective throat area raises the pressure upstream of the throat and thereby increases the thrust. Elevated pressure also increases the burn rate of the propellant, adding further to the thrust. This ability to vary the effective throat area allowed the use of variable thrust to be extended to include steering and orientation adjustments during flight in addition to the boost-sustain transition.

Numerous systems have been designed to vary the throat area by means that are independent of the burning stage of the propellant and controllable from outside the nozzle. These systems are useful for both boost-sustain transitions and for steering and orientation, and can be used in both single-thruster and multiple-thruster motors. A mechanism for throat area variation in a rocket nozzle that has proved to be particularly successful is the use of a pintle that extends into the nozzle and is movable along the nozzle axis. The pintle is either a tapered or flared body that partially obstructs the throat, forcing the combustion gas to flow in the annular space between the pintle and the throat wall. Because of the pintle profile, movement of the pintle by only a small distance causes a significant change in the cross section area of the annular space and hence the effective throat area of the nozzle and therefore the thrust. When multiple nozzles with independently movable pintles are present, a controller can coordinate the pintle positions to produce different thrust levels among the nozzles to achieve thrust differentials for purposes of steering, attitude control and directional effects in general. Movement of the pintle is achieved by actuators that employ any of a variety of mechanisms, including hydraulic drives and gear drives.

One of the challenges that are faced in the design of a pintle-actuated thrust chamber is the need to control the wear on and damage to the pintle actuator that are caused by the exposure of the actuator to the harsh conditions of the thrust chamber, notably the high temperatures and pressures in the chamber. The wear that these conditions produce on the actuator components causes the actuator to deteriorate and thereby limit the duty cycle of the thruster. The highest temperature occurs in the vicinity of the throat, and heat is readily transmitted from the throat along the pintle body to the actuator. Another challenge is the need for a dynamic seal between the pintle and the thrust chamber that will both retain the pressure and accommodate the movement of the pintle. In designs where the pintle actuator is incorporated in the thrust chamber, the dynamic seal resides in the thrust chamber as well, with little or no insulation protecting the seal from the high heat at the throat. In these designs as well, the chamber must be large enough to enclose the actuator and therefore consumes valuable space within the propulsion system. This has been partially remedied by placing the actuator external to the thrust chamber, with the seal mounted in the thrust chamber wall. Even in the wall, however, the seal is still exposed to the high temperature of the thrust chamber and the resulting deterioration limits the useful life span of the seal.

SUMMARY OF THE INVENTION

The present invention resides in a novel arrangement of pintle, pintle actuator and dynamic seal that places the seal at a distance from the thrust chamber. This offers advantages that include a smaller thrust chamber size and greater thermal stand-off, which is the ability to maintain the seal at a lower temperature than the chamber, either due to heat dissipation along the length of the pintle or to a sufficient distance between the seal and the site of highest temperature in the chamber. The arrangement also provides the thruster with a longer duty cycle. These advantages are achieved by constructing the pintle with a shaft that extends through the thrust chamber wall and constructing the chamber with a boss on the external surface of the chamber wall, with a dynamic seal inside the boss and arranged to engage the pintle shaft. Actuation of the pintle is achieved by a rack affixed to the pintle shaft and a gear engaging the rack, both rack and gear being external to the chamber as well. In preferred embodiments of the design, the rack and gear are both external to, but in close proximity to, the boss.

With both the dynamic seal and the actuator external to the thrust chamber, the invention allows the thrust chamber to be of relatively reduced size. This provides the chamber with a more compact external envelope without reducing the thermal standoff, and allows the chamber to be light in weight and to occupy only a small volume in the rocket motor. The invention also allows the thrust chamber to be constructed with increased thermal standoff without an increase in length. The increased thermal standoff allows the thruster to withstand a longer exposure time to hot combustion gases, and thereby a longer duty cycle. This leads to improved performance of the thruster and allows the thruster to be used for a greater number of mission operations.

Further objects, features, and advantages will be apparent from the description that follows.

DETAILED DESCRIPTION OF THE INVENTION AND SPECIFIC EMBODIMENTS

Figure 1:
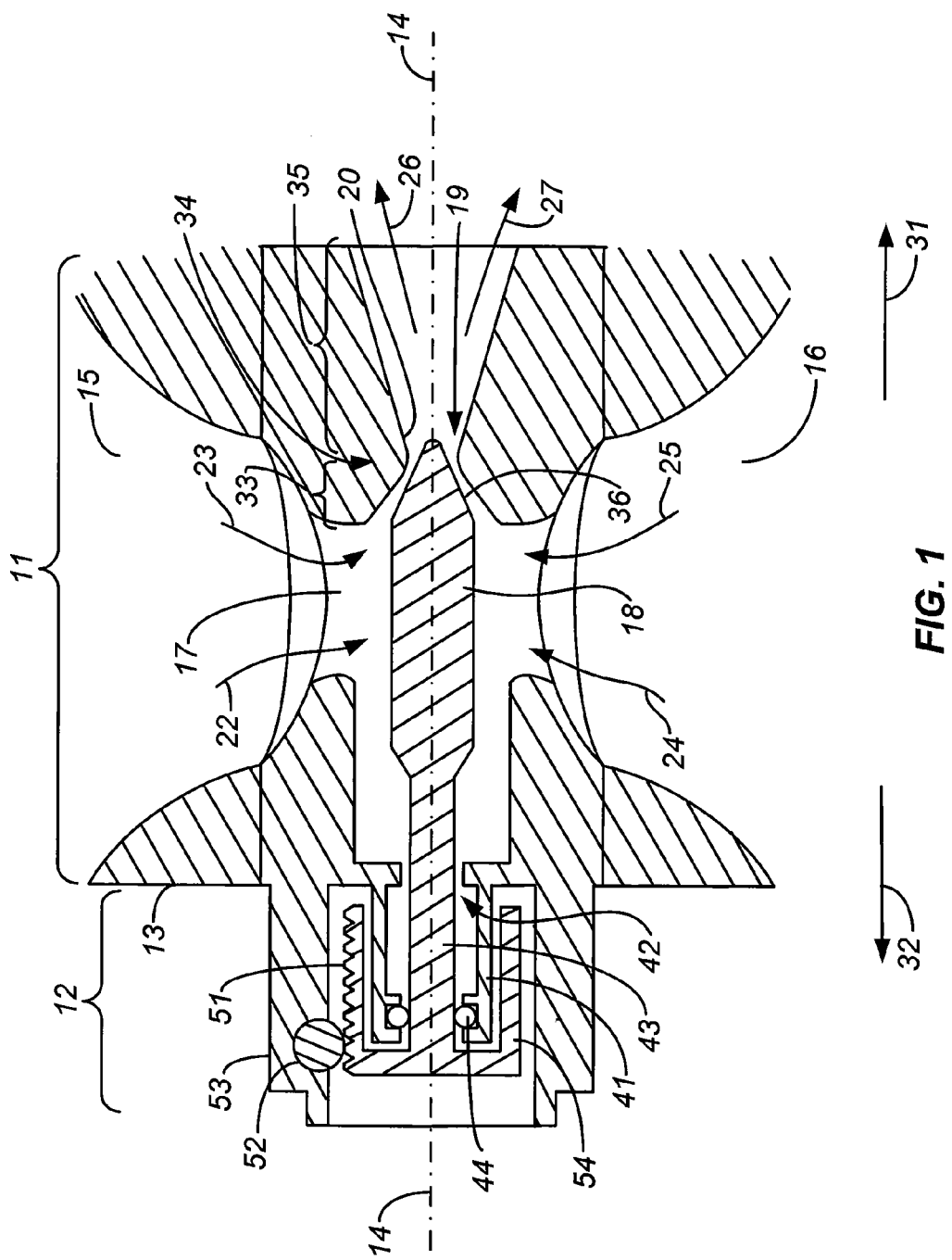
FIG. 1 is a cross section of one embodiment of a pintle-controlled thrust chamber of the present invention.

While the invention is susceptible to a number of implementations and embodiments in terms of the design and construction of the propulsion system, an understanding of the full scope of invention can be gained by a detailed review of a single embodiment. One such embodiment is depicted in the drawings hereto and explained below.

Figure 2:
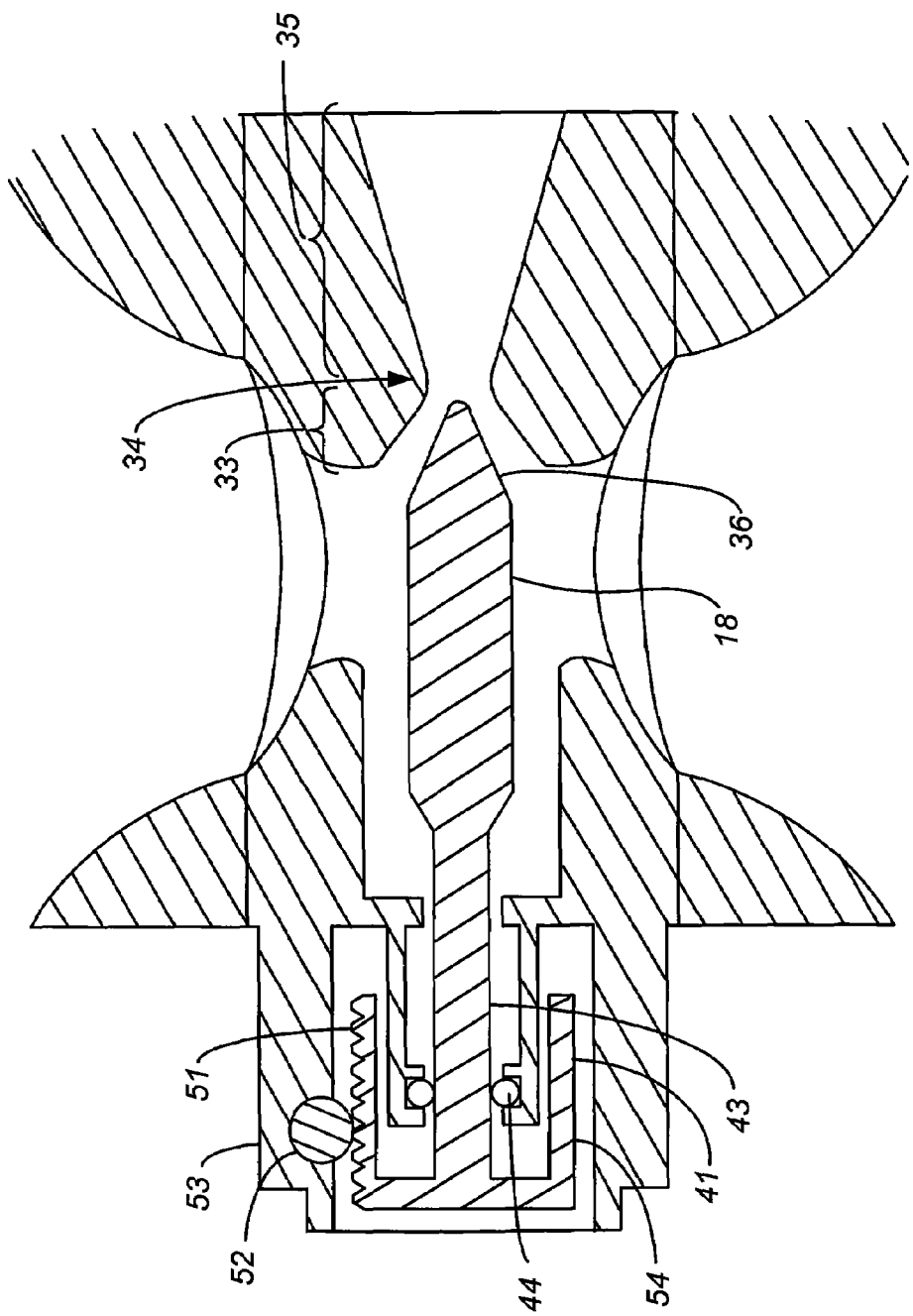
FIG. 2 is the same cross section as FIG. 1 but with the pintle retracted from the throat of the nozzle within the thrust chamber.

The system shown in FIGS. 1 and 2 includes a thrust chamber 11 and a seal and actuator section 12 that is mounted to the outer surface 13 of an external wall of the thrust chamber. The thrust chamber in this embodiment is a body of revolution about an axis 14. Combustion gases enter the thrust chamber 11 through lateral inlets 15, 16, the gases being either fully combusted upon entry or partially combusted to complete combustion within the thrust chamber cavity 17. Although two such inlets 15, 16 are shown, a single inlet may be sufficient in certain constructions, but preferred constructions are those that include a plurality of such inlets symmetrically distributed around the thrust chamber. The gases entering through the inlets flow around the pintle 18 and through the annular space 19 between the pintle and the thrust chamber wall 20 to leave through the outlet plane 21. The directions of flow are shown by the arrows 22, 23, 24, 25, 26, 27, and the aft direction of the nozzle is toward the right in the view shown in FIGS. 1 and 2 as indicated by the arrow 31, while the fore direction is toward the left as indicated by the arrow 32. The thrust chamber wall is formed into a converging section 33, a throat 34, and a diverging section 35, which collectively define the exhaust nozzle of the propulsion system, and the tapering aft end 36 of the pintle extends into the exhaust nozzle. In FIG. 1, the aft end of the pintle extends into the throat 34.

The seal and actuator section 12 includes a boss 41 protruding from the external surface 13 of the thrust chamber and surrounding an orifice 42 in the thrust chamber wall. The pintle 18 includes a shaft 43 at its fore end that passes through the orifice 42 and the boss 41. Although the dimensions are not critical to the novelty or utility of this invention, the boss 41 in preferred embodiments of the invention has a height that is equal to or greater than twice the diameter of the shaft 43. An o-ring 44 resides within a groove along the interior surface of the boss, the o-ring forming a dynamic seal between the boss and the pintle shaft. This dynamic seal seals the pressure in the thrust chamber cavity 17 while allowing the pintle shaft 43 to move back and forth within the boss 41 along the axis 14, which movement in turn causes the aft end 36 of the pintle to move into and out of the throat 34 of the nozzle.

These movements are driven by the actuator components in the seal and actuator section 12. These components include a rack 51 and a gear 52 that engages the rack. The gear 52 is driven by conventional motor components which are not shown in these drawings but may include a stepper motor or any type of mechanical drive known among those skilled in the art of mechanical drives. The rack 51 is affixed to the fore end of the pintle shaft 43, and the gear 52 is mounted to a support structure which can be a bracket of any kind or, as shown, a second or outer boss 53 which encircles the boss 43 in which the dynamic seal 44 is constructed (i.e., the inner boss). The rack 51 in the embodiment shown is a row of teeth molded or machined into the outer surface of a cylinder 54 that is secured to the fore end of the pintle shaft. The cylinder 54 extends over a portion of the pintle shaft and is sufficiently wide to encircle the inner boss 43. Rotation of the gear 52 translates to non-rotary axial movement of the cylinder 54 and hence the pintle 18. This movement is illustrated by a comparison of FIGS. 1 and 2 which show the pintle in two positions, extending into the throat 34 in FIG. 1 to produce a relatively high thrust, and withdrawn from the throat in FIG. 2 to produce a reduced thrust.

Figure 3:
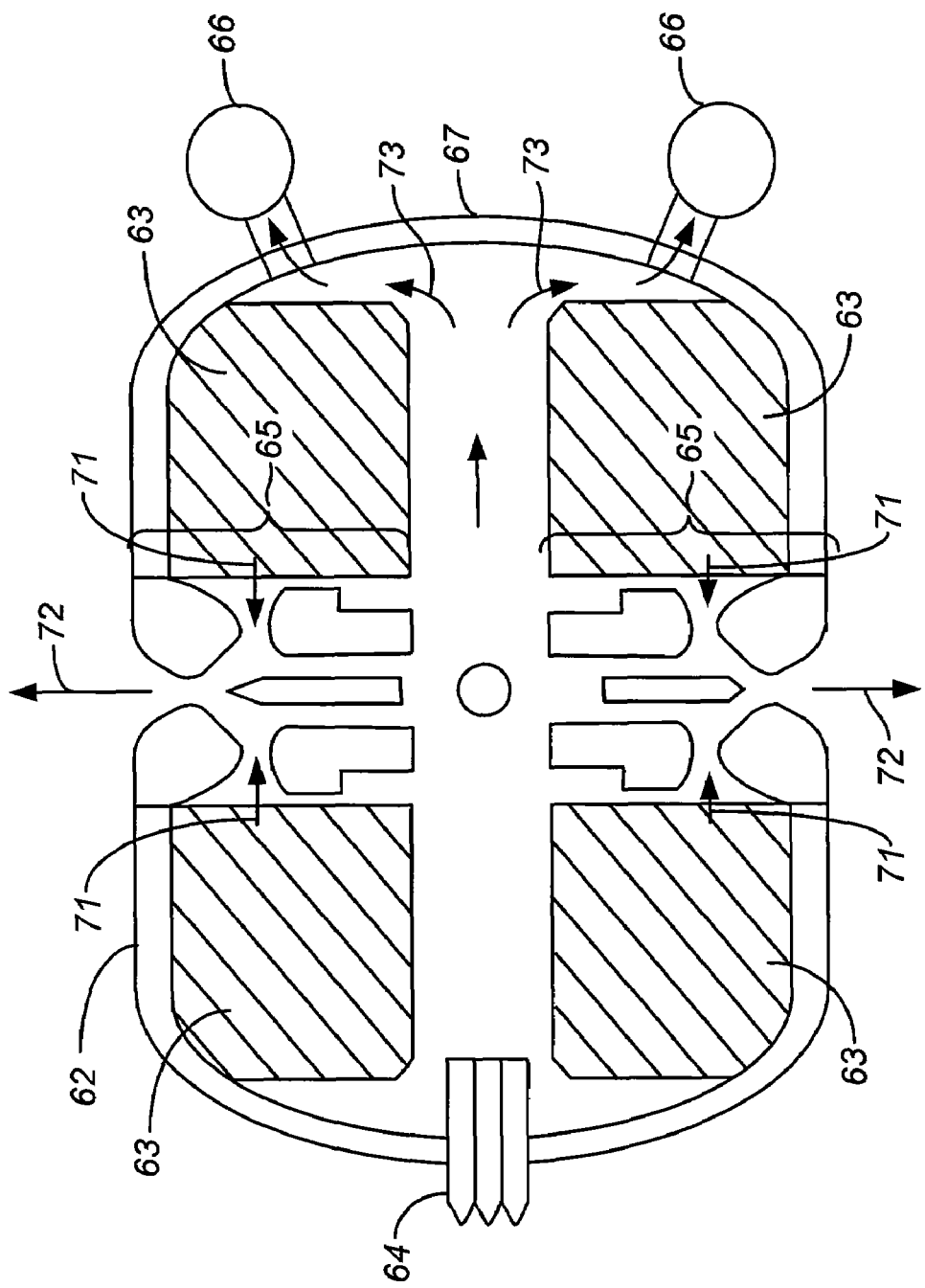
FIG. 3 is a cross section of a motor incorporating several thrust chambers of the type depicted in FIGS. 1 and 2.

FIG. 3 depicts a propulsion motor 61 that contains several thrusters including those arranged for diversion (steering) and attitude control (orientation). The motor 61 is contained in a motor case 62 that includes solid propellant grains 63, an igniter 64, a series of four divert thrusters 65 (only two of which are visible) arranged circumferentially around the motor, and a series of six attitude control thrusters 66 (of which only two are visible) in the aft dome 67 of the motor. Each of the ten thrusters has a pintle-containing structure as depicted in FIGS. 1 and 2, although the components of the structure are shown only in the divert thrusters 65. The direction of combustion gas flow into the divert thrusters is indicated by the arrows 71, while flow of exhaust gas from the divert thrusters is indicated by the arrows 72. Combustion gas flow to the attitude control thrusters is indicated by the arrows 73.

Figure 4:
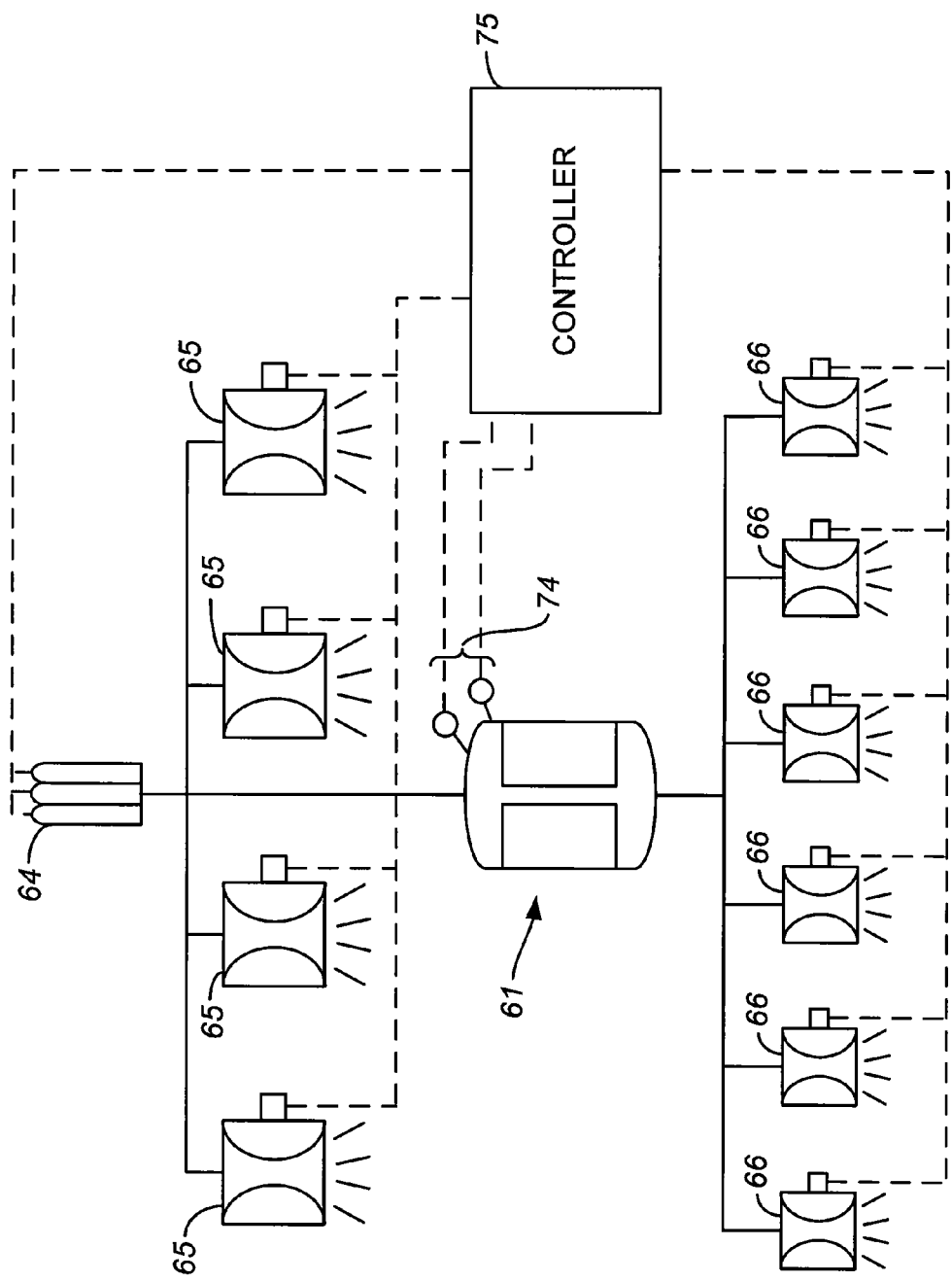
FIG. 4 is a diagram of a propulsion system with controller for the motor of FIG. 3.

FIG. 4 is a diagrammatical representation of a control circuit for the propulsion motor of FIG. 3. The igniter 64, the four divert thrusters 65, and the six attitude control thrusters 66 are shown separated from the motor 61 for purposes of clarity. A desktop computer 74 is used to send commands to a controller 75 for diversion and attitude control, and the controller in turn converts these commands to appropriate signals to the igniter, the divert thrusters, and the attitude control thrusters.

The foregoing is presented primarily for purposes of illustration. Variations, modifications, and substitutions that still embody the central points of novelty and functionality of the invention will be readily apparent to those skilled in the art and are encompassed within the scope of the invention. For example, the o-ring used as the dynamic seal can be replaced by packings, piston cups, chevron seals, pressure seals, and in general any seal capable of sustaining the maximum desired chamber pressure; the number of divert thrusters can range from one to eight; the number of attitude control thrusters can range from four to eight; the thrust chambers can be of square or rectangular cross section rather than bodies of revolution; the rack can be on a single rail or two or more rails rather than on a cylinder; and other variations that are matters of routine engineering design.

The term "a" or "an" is intended to mean "one or more." The term "comprising" when preceding the recitation of a step or an element is intended to mean that the addition of further steps or elements is optional and not excluded.

What is claimed is:

1. A pintle-controlled variable-thrust propulsion system comprising:

a thrust chamber having a combustion gas inlet, an exhaust nozzle, and an external wall with an opening surrounded by a boss on an external surface of said external wall;

a pintle having an aft end extending into said nozzle and a shaft that protrudes through said boss and terminates at a fore end, said pintle axially movable within said boss and said thrust chamber to define a throat of variable area in said nozzle;

a dynamic seal positioned between said shaft and an interior surface of said boss; and a rack affixed to said fore end of said pintle and extending aftward over said boss, and a gear engaging said rack whereby rotation of said gear translates to axial movement of said pintle.

2. A pintle-controlled variable-thrust propulsion system comprising:

a thrust chamber having a combustion gas inlet, an exhaust nozzle, and an external wall with an opening surrounded by a boss on an external surface of said external wall;

a pintle having an aft end extending into said nozzle and a shaft that protrudes through said boss and terminates at a fore end, said pintle axially movable within said boss and said thrust chamber to define a throat of variable area in said nozzle;

a dynamic seal positioned between said shaft and an interior surface of said boss; and a rack affixed to said fore end of said pintle wherein said rack is a cylinder encircling said boss, and a gear engaging said rack whereby rotation of said gear translates to axial movement of said pintle.

3. A pintle-controlled variable-thrust propulsion system comprising:

a thrust chamber having a combustion gas inlet, an exhaust nozzle, and an external wall with an opening surrounded by a boss on an external surface of said external wall;

a pintle having an aft end extending into said nozzle and a shaft that protrudes through said boss and terminates at a fore end, said pintle axially movable within said boss and said thrust chamber to define a throat of variable area in said nozzle;

a dynamic seal positioned between said shaft and an interior surface of said boss; and a rack affixed to said fore end of said pintle wherein said rack is a cylinder encircling said boss with teeth on an outer surface of said cylinder, and a gear engaging said rack whereby rotation of said gear translates to axial movement of said pintle.

4. The pintle-controlled variable-thrust propulsion system of claim 1 wherein said gear is a toothed wheel and said shaft, rack, and gear are constructed such that rotation of said gear translates to non-rotary axial movement of said pintle.

5. A pintle-controlled variable-thrust propulsion system comprising:

a thrust chamber having a combustion gas inlet comprising a plurality of openings symmetrically distributed around said thrust chamber, an exhaust nozzle, and an external wall with an opening surrounded by a boss on an external surface of said external wall;

a pintle having an aft end extending into said nozzle and a shaft that protrudes through said boss and terminates at a fore end, said pintle axially movable within said boss and said thrust chamber to define a throat of variable area in said nozzle;

a dynamic seal positioned between said shaft and an interior surface of said boss; and a rack affixed to said fore end of said pintle, and a gear engaging said rack whereby rotation of said gear translates to axial movement of said pintle.

6. The pintle-controlled variable-thrust propulsion system of claim 1 wherein said boss has a height equal to or greater than twice the diameter of said shaft.

7. A throttling divert and attitude control system for an aircraft vehicle, said system comprising:

a combustion chamber;

a plurality of diverter thrusters receiving combustion gas from said combustion chamber with nozzles oriented radially outward from a common axis, and a plurality of attitude control thrusters receiving combustion gas from said combustion chamber with nozzles oriented at an acute angle relative to said axis, each of said diverter and attitude control thrusters comprising a pintle-controlled variable thrust propulsion system comprising:

a thrust chamber having a combustion gas inlet, an exhaust nozzle, and an external wall with an opening surrounded by a boss on an external surface of said external wall;

a pintle having an aft end extending into said nozzle and a shaft that protrudes through said boss and terminates at a fore end, said pintle axially movable with said boss and said thrust chamber to define a throat of variable area in said nozzle;

a dynamic seal positioned between said shaft and an interior surface of said boss; and a rack affixed to said fore end of said pintle, and a gear engaging said rack whereby rotation of said gear translates to axial movement of said pintle; and a controller supplying electronic control signals to each of said diverter and attitude control thrusters to actuate said pintles independently and thereby align said combustion chamber with a target.

* * * * *